United States Patent [19]

Yamamoto et al.

[11]  4,202,850
[45]  May 13, 1980

[54] PROCESS FOR PRODUCING FIBER-REINFORCED ELASTIC ARTICLES

[75] Inventors: Shinji Yamamoto; Kouhei Kaijiri; Denichi Oda, all of Ichihara, Japan

[73] Assignee: Ube Industries, Ltd., Ube, Japan

[21] Appl. No.: 891,462

[22] Filed: Mar. 29, 1978

[30] Foreign Application Priority Data

Apr. 12, 1977 [JP] Japan ............................... 52/40903
Jul. 11, 1977 [JP] Japan ............................... 52/81957

[51] Int. Cl.$^2$ ............................................. B29D 3/02
[52] U.S. Cl. ......................................... 264/108; 260/5; 264/171; 264/175; 264/236; 264/347; 525/236
[58] Field of Search ............... 264/175, 236, 108, 347, 264/DIG. 47, 171; 260/887, 894, 5

[56] References Cited

U.S. PATENT DOCUMENTS

| | | | |
|---|---|---|---|
| 3,315,020 | 4/1967 | Gore | 264/DIG. 47 |
| 3,382,305 | 5/1968 | Breen | 264/DIG. 47 |
| 3,697,364 | 10/1972 | Boustany et al. | 264/108 |
| 3,725,331 | 4/1973 | Lesage et al. | 260/894 |
| 3,778,424 | 12/1973 | Sugiura et al. | 526/136 |
| 3,827,991 | 8/1974 | Ando et al. | 260/894 |
| 3,836,412 | 9/1974 | Boustany et al. | 264/108 |
| 3,852,225 | 12/1974 | Ishikawa et al. | 260/887 |
| 3,901,868 | 8/1975 | Veno et al. | 526/136 |

Primary Examiner—Jeffery R. Thurlow
Attorney, Agent, or Firm—Miller & Prestia

[57] ABSTRACT

Disclosed is a process for producing fiber-reinforced elastic articles comprising: 1 to 20 parts by weight of 1,2-polybutadiene fibrils dispersed in a matrix of 100 parts by weight of a rubber material. In the process, the 1,2-polybutadiene in the form of particles are dispersed in the matrix of rubber material; the dispersion is extruded through a die at a temperature of at least 5° C. above the melting point of 1,2-polybutadiene, but not exceeding 240° C., to convert the particles of 1,2-polybutadiene into fibrils; the extruded dispersion is rolled by means of a pair of rollers to increase the degree of molecular orientation of the 1,2-polybutadiene fibrils, and; a composition comprising an elastic material matrix, the 1,2-polybutadiene fibrils dispersed in the elastic material matrix and a vulcanizing agent is shaped and vulcanized at an elevated temperature.

14 Claims, No Drawings

PROCESS FOR PRODUCING FIBER-REINFORCED ELASTIC ARTICLES

The present invention relates to a process for producing a fiber-reinforced elastic article. More particularly, the present invention relates to a process for producing a fiber-reinforced elastic article having an excellent mechanical strength, modulus of elasticity and rubber elasticity, without preliminarily shaping the reinforcing material into fibers before the elastic article-producing process.

Conventional fiber-reinforced elastic articles are prepared by dispersing organic or inorganic fibers, for example, nylon 6, nylon 66, polyester, formalized polyvinyl alcohol, regenerated cellulose, glass and carbon fibers, in a matrix of an elastic material such as a natural rubber or synthetic rubber; mixing the resultant dispersion with a vulcanizing agent, and; shaping and vulcanizing the mixture at an elevated temperature.

In the above-mentioned conventional processes, the reinforcing material is required to be preliminarily shaped into fibers before it is dispersed in the elastic material matrix. Also, the conventional reinforcing fibers have a poor adhering property to the elastic material matrix. Accordingly, in order to obtain a high mechanical strength and modulus of elasticity by using the conventional reinforcing fibers, it is required that the reinforcing fibers be used in a large amount of 30 parts based on 100 parts of the elastic material matrix. The above-mentioned requirements cause the resultant fiber-reinforced elastic article to be expensive and to have a significantly reduced elongation, and substantially no rubber-like elasticity and resiliency. Also, the large amount of the reinforcing fibers is difficult to uniformly disperse in the elastic material matrix.

An object of the present invention is to provide a process for producing a fiber-reinforced elastic article exhibiting a rubber-like elasticity, and having an excellent mechanical strength and modulus of elasticity.

Another object of the present invention is to provide a process for producing a fiber-reinforced elastic article, without using preliminarily provided reinforcing-fibers.

The above-mentioned objects can be attained by the process of the present invention which comprises the steps of:

kneading a mixture of a rubber material capable of being vulcanized and powdered 1,2-polybutadiene in an amount of 1 to 200 parts by weight per 100 parts by weight of the rubber material, at a temperature lower than the melting point of the 1,2-polybutadiene, to disperse the particles of the 1,2-polybutadiene in the matrix of the rubber material;

extruding the dispersion through a die at a temperature of at least 5° C. above the melting point of the 1,2-polybutadiene, but not higher than 240° C., to provide a strand or tape of the dispersion in which the dispersed 1,2-polybutadiene is in the form of fibrils;

rolling the extruded dispersion by means of a pair of rollers to provide a tape or sheet of the dispersion and to increase the degree of molecular orientation of the 1,2-polybutadiene fibrils;

providing a composition, (A) when the content of the 1,2-polybutadiene in the rolled dispersion is in a range of from 1 to 20 parts by weight per 100 parts by weight of the rubber material, by admixing the rolled dispersion with a vulcanizing agent, or (B) when the content of the 1,2-polybutadiene in the rolled dispersion is more than 1 part by weight, but not more than 200 parts by weight per 100 parts by weight of the rubber material, by admixing the rolled dispersion with a vulcanizing agent and an additional rubber material, the additional rubber material being in an amount which is enough for adjusting the content of the 1,2-polybutadiene in the resultant composition to a level of from 1 to 20 parts by weight per 100 parts by weight of the sum of the rubber material and the additional rubber material, and;

shaping and vulcanizing the composition to provide a shaped vulcanized elastic article.

In this specification, the values of the viscosities of the rubber materials and additional rubber materials, and the dispersion of 1,2-polybutadiene particles or fibrils in the rubber materials, additional rubber materials or the mixtures thereof are as determined by means of a high level type flow tester made by Shimazu Seisakusho, Japan, through which the material to be tested was extruded at a temperature of 220° C., at a shearing rate of 10/second. Also, the values of the reduced viscosity of 1,2-polybutadiene in this specification are as determined by using a solution of 0.2 g of 1,2-polybutadiene in 100 ml of tetrahydronaphthalene at a temperature of 135° C.

The rubber material to be mixed with the powdered 1,2-polybutadiene is not restricted to a special group of rubbers, as long as the rubber material does not have a large tendency to be gelled at a temperature at which the dispersion of 1,2-polybutadiene in the rubber material is extruded. For example, the rubber material can be selected from the group consisting of natural rubber, cis-1,4-polybutadiene, polyisoprene, polychloroprene, styrene-butadiene copolymers, isoprene-isobutylene copolymers, ethylene-propylene-diene terpolymers and mixtures of two or more of the above-mentioned materials. Especially, the most preferable rubber materials for the process of the present invention are selected from natural rubber, polyisoprene and mixtures of the above-mentioned materials.

The 1,2-polybutadiene usable for the process of the present invention can be produced in accordance with any known methods, for example, described in U.S. Pat. Nos. 3,778,424 and 3,901,868. The 1,2-polybutadiene preferably has a melting point of from 130° to 210° C. The melting point is preferably at least 10° C. above the vulcanizing temperature to be applied to the fiber-reinforced composition. It is also preferable that the 1,2-polybutadiene contain 80% or more of the 1,2-structure.

The particles of 1,2-polybutadiene are not limited to a special configuration and size, as long as the particles can be evenly dispersed in the matrix of the rubber material. Generally, the powdered 1,2-polybutadiene which can pass through a screen of 10 mesh in Tylar Standard, is beneficially used in the process of the present invention. When an extruder having no torpedo located at the outlet end of the cylinder is used, it is preferable that the powdered 1,2-polybutadiene contain particles thereof each having a size of from 10 to 500 microns in an amount of at least 90% based on the total weight of the 1,2-polybutadiene.

It is also preferable that the 1,2-polybutadiene have a reduced viscosity of from 0.8 to 2.5 dl/g determined in tetrahydronaphthalene at a temperature of 135° C. If the reduced viscosity of the 1,2-polybutadiene used is outside of the above-mentioned range, the resultant fiber-reinforced elastic article sometimes has an unsatisfactory low mechanical strength and modulus of elasticity.

In the preparation of the mixture of the vulcanizble rubber material with the powdered 1,2-polybutadiene, it is necessary that the 1,2-polybutadiene be used in an amount of from 1 to 200 parts per 100 parts of the rubber material. If the amount of the 1,2-polybutadiene falls outside of the above-mentioned range, the resultant elastic article will not have an excellent mechanical strength and modulus of elasticity.

The kneading operation of the mixture of the vulcanizable rubber material with the 1,2-polybutadiene is carried out at a temperature lower than the melting point of the 1,2-polybutadiene to evenly disperse the particles of the 1,2-polybutadiene in the rubber matrix. If the kneading operation is carried out at the melting temperature of the 1,2-polybutadiene or higher, it will be impossible to obtain an elastic article having an excellent mechanical strength and modulus of elasticity. The kneading operation may be effected by means of any of the conventional kneading machines, for example, Brabender, Banbary mixer, two-roll mill and extruder.

In the case where a natural rubber is used as a vulcanizable rubber material in the process of the present invention, it is preferable that the kneading operation for the mixture of the natural rubber and 1,2-polybutadiene be continued until the resultant dispersion attains a viscosity within a range of from $1 \times 10^3$ to $1 \times 10^6$ poises.

Next, the kneaded dispersion is extruded through a die to provide a strand or tape of the dispersion. The extruding operation is carried out at a temperature of at least 5° C. above the melting point of the 1,2-polybutadiene, but not higher than 240° C. The extruding operation can be carried out by using any type of conventional extruders. As a result of the extruding operation, the particles of 1,2-polybutadiene are converted into fibrils which are uniformly dispered in the matrix of the rubber material. If the extruding temperature is lower than the temperature of 5° C. above the melting point of the 1,2-polybutadiene, the particles of 1,2-polybutadiene will not be converted into fibrils and, therefore, the resultant elastic article will not have an excellent mechanical strength and modulus of elasticity. Also, an extruding temperature higher than 240° C. will cause the dispersion of the 1,2-polybutadiene particles in the rubber material matrix to be gelled, and the resultant elastic article will have a poor mechanical strength and modulus of elasticity.

In the extruding operation, the kneaded dispersion is extruded through a die suitable for producing a strand or tape of the dispersion. For example, the die may be selected from a circular die, rectangular die and T-shaped die. The circular die is most preferable. The circular die may be provided with a torpedo. When the circular die is used, it is preferable that the inner diameter of the extruding nozzle be in a range of from 0.1 to 5 mm and the ratio of the length (L) to the inner diameter (D) be in a range of from 1 to 20. When a rectangular die or T-shaped die is used, it is preferable that the width of slit of the die be in a range of from 0.1 to 5 mm, the length of the slit be in a range of from 10 to 500 mm and the length of the dieland be in a range of from 10 to 20 mm.

In the extruding operation in the process of the present invention, in order to obtain an elastic article having an increased mechanical strength and modulus of elasticity by using the above-mentioned type of extruder, it is preferably that the temperatures of the outlet part of the cylinder be adjusted into a range of from 165° to 240° C. and the temperatures of the circular die be adjusted into a range of from at least 5° C. above the melting point of the 1,2-polybutadiene to 240° C.

Next, the extruded dispersion is rolled by means of a pair of rollers. The rolling operation is carried out to the extent that the resultant taper or sheet attains a thickness of 0.02 mm or more, but does not exceed one half the thickness of the extruded strand or tape of the dispersion. The rolling operation is preferably carried out at a temperature of from 20° to 80° C. As a result of the rolling operation, the molecular orientation of the 1,2-polybutadiene fibrils in the matrix is increased, and the resultant fibrils have a thickness of from 0.05 to 20 microns. The increase in the molecular orientation results in an increase in the mechanical strength and modulus of elasticity of the 1,2-polybutadiene fibrils, and eventually, of the resultant elastic article.

Next, a composition to be subjected to the shaping and vulcanizing processes is prepared from the above-mentioned rolled dispersion. When the content of the 1,2-polybutadiene in the rolled dispersion is in a range of from 1 to 20 parts by weight per 100 parts by weight of the rubber material, the composition may be prepared by admixing the rolled dispersion with a vulcanizing agent. In this case, the resultant composition also contains 1 to 20 parts by weight of 1,2-polybutadiene fibrils per 100 parts by weight of the rubber material. When the content of the 1,2-polybutadiene in the dispersion is more than 1 part by weight but not more than 200 parts by weight per 100 parts by weight of the rubber material, the composition may be prepared by admixing the rolled dispersion with a vulcanizing agent and an additional rubber material. In this case, the additional rubber material should be used in an amount which is enough for adjusting the content of the 1,2-polybutadiene fibrils in the resultant composition to a level of from 1 to 20 parts by weight per 100 parts by weight of the sum of the rubber material and the additional rubber material.

If the content of the 1,2-polybutadiene fibrils in the composition is less than 1 part by weight per 100 parts by weight of the rubber matrix, the resultant elastic article will have an unsatisfactory low mechanical strength and modulus of elasticity. Also, a content of the 1,2-polybutadiene fibrils larger than 20 parts by weight per 100 parts by weight of the rubber matrix will result in an excessively large viscosity of the composition and, thus, in poor process-ability of the composition, and also, will result in a reduced mechanical strength and break elongation of the resultant elastic article. The additional rubber materials may be either the same as or different from the afore-mentioned rubber materials. That is, the additional rubber material can be selected from, for instance, natural rubber, cis-1,4-polybutadiene, polyisoprene, polychloroprene, styrene-butadiene copolymers, isoprene-isobutylene copolymers, ethylene-propylene-diene terpolymers, and mixtures of two or more of the above-mentioned materials.

Finally, the composition prepared as mentioned above is subjected to shaping and vulcanizing processes to provide a shaped, vulcanized elastic article. The vulcanizing process is preferably carried out at a temperature of 10° C. or more below the melting point of the 1,2-polybutadiene, more preferably, in a range of from 120° to 180° C.

The vulcanizing agent usable for the process of the present invention is not limited to a special group of compounds. For example, sulphur and organic peroxides such as dicumyl peroxide, aromatic nitro compounds such as diphenyl quanidine, and selenium and tellurium compounds such as selenium- and tellurium-diethyldithiocarbamates, can be used as the vulcanizing agent. The vulcanizing agent is preferably contained in an amount of from 0.5 to 10% based on the weight of the matrix consisting of the rubber material and, if used, the additional rubber material. The methods for shaping and vulcanizing the composition can be selected from any conventional shaping and vulcanizing methods for conventional rubber compositions. The shaping process may be carried out simultaneously with the vulcanizing process. Otherwise, the shaping process may be followed by the vulcanizing process.

The aforementioned composition usable for the process of the present invention can contain any conventional additives usable for conventional rubber compositions, for instance, fillers such as carbon black, vulcanizing accelerator such as mercaptobenzothiazole, antioxidant such as phenyl-$\beta$-naphthylamine and process oil. The additives may be selected taking into account the types of the rubber material, the additional rubber material and the use of the resultant elastic article.

By the vulcanizing process, not only the rubber material and the additional rubber material is vulcanized, but the surface portions of the 1,2-polybutadiene fibrils are also vulcanized so as to form cross-linkages between the 1,2-polybutadiene fibrils and the rubber matrix.

In the process of the present invention, the mixture to be kneaded may contain 100 parts by weight or less of a process oil per 100 parts by weight of the rubber material. The process oil is effective for uniformly dispersing the particles of the 1,2-polybutadiene in the matrix of the rubber material and for increasing the processability of the dispersion. The process oil may be selected from any conventional process oils usable as an additive to the rubber composition. The process oil may be a paraffin type, naphthene type or aromatic type process oil. The process oil is preferably contained in an amount of 100 parts by weight or less, more preferably, from 20 to 50 parts by weight per 100 parts by weight of the rubber material matrix. Usually, it is difficult to mix the process oil in an amount of more than 100 parts by weight into 100 parts by weight of the rubber material. Also, the use of the process oil in an amount more than 100 parts by weight per 100 parts by weight of the rubber material causes a difficulty in uniformly dispersing the 1,2-polybutadiene particles, and also, causes the resultant elastic article to have a poor mechanical strength and modulus of elasticity. The composition to be shaped and vulcanized preferably contains the process oil in an amount of 40 parts or less per 100 parts of the rubber matrix which is composed of the rubber material alone or a mixture of the rubber material and the additional rubber material.

The fiber-reinforced elastic article of the present invention can be utilized as material for producing tires, belts, hoses and footwear which need to have a high mechanical strength, modulus of elasticity and rubber-like elasticity.

The present invention will be further illustrated by the following examples, which are presented for the purpose of illustration only and should not be interpreted as limiting the scope of the present invention.

In the examples, the physical properties of the fiber-reinforced elastic articles were determined in accordance with the methods of ASTM D 412-61T.

In the examples, the powdered 1,2-polybutadiene contained particles having a size of from 10 to 500 microns in an amount of 90% based on the total weight of the 1,2-polybutadiene, unless otherwise indicated.

Also, the terms "part" and "percent" used in the examples are all based on weight.

EXAMPLE 1

26 parts of natural rubber having a viscosity of $2 \times 10^5$ poises were placed in a Brabender type kneader and kneaded at a temperature of 80° C. for 1 minute. 6.4 parts of powdered 1,2-polybutadiene having a reduced viscosity of 2.06 dl/g, a melting point of 206° C. and a content of 1,2-structure of 99% were mixed with the natural rubber and the mixture was kneaded in the Brabender type kneader at a temperature of 80° C. for 4 minutes, and thereafter, further kneaded by means of a two roller type kneader at a temperature of 80° C. for 10 minutes to uniformly disperse the particles of 1,2-polybutadiene in the matrix of the natural rubber. The resulting kneaded dispersion had a viscosity of $0.7 \times 10^4$ poise.

The dispersion was fed into a high level type flow tester and extruded through a circular die, having an inner diameter of 1 mm and a ratio of length to inner diameter of 2/1, at a temperature of 220° C., to provide a strand of the dispersion having a diameter of about 2 mm. The strand of the dispersion was rolled by means of a pair of rollers, having a clearance of 0.2 mm between the rollers, at a temperature of 50° C., to provide a tape of the rolled dispersion having a thickness of 0.5 mm.

32.4 parts of the resulting rolled dispersion, were mixed, in a Brabender type kneader, with 74 parts of natural rubber of International Standard RSS3, 50 parts of carbon black of the trademark Diablack I, made by Mitsubishi Kasei Kogyo K.K. Japan, 5 parts of an aromatic type process oil of the trademark Esso Process Oil H-1, made by Toa Nenryo Kogyo K.K., Japan, 5 parts of zinc oxide powder, 4 parts of stearic acid, and 1 part of phenyl-$\beta$-naphthyl amine, and then, the mixture was kneaded at a temperature of 80° C. for 5 minutes. The kneaded mixture was admixed with 1 part of 2-mercaptobenzothiazole and 3 parts of sulphur and the admixture was kneaded by means of a pair of rollers at a temperature of 83° C. for 5 minutes, to provide a composition.

The composition was placed in a mold and vulcanized at a temperature of 150° C. for 40 minutes. The physical properties of the resultant fiber-reinforced elastic article are shown in Table 1.

COMPARISON EXAMPLE 1

Procedure identical to those mentioned in Example 1 were carried out, except that no 1,2-polybutadiene was used, to provide an elastic article. The physical properties of the article are shown in Table 1.

EXAMPLE 2

The same procedures as those described in Example 1 were carried out, except that the 1,2-polybutadiene used had a reduced viscosity of 1.27 dl/g and a melting point of 200° C. and contained 99% of 1,2-structure, to produce an elastic article. The kneaded dispersion had a viscosity of $1.0 \times 10^4$ poises. The physical properties of the resultant fiber-reinforced elastic article are shown in Table 2.

EXAMPLE 3

The same procedures as those mentioned in Example 1 were carried out, except that the 1,2-polybutadiene used had a reduced viscosity of 0.99 dl/g and a melting point of 196° C., and contained 99% of 1,2-structure, and the temperature of the circular die was 215° C., to produce a fiber-reinforced elastic article. The kneaded dispersion had a viscosity of $0.13 \times 10^4$ poises. The physical properties of the resulting fiber-reinforced elastic article are shown in Table 1.

EXAMPLE 4

The same procedures as those mentioned in Example 2 were carried out, except that a rectangular die having a slit width of 1 mm, a slit length of 10 mm and a dieland length of 20 mm was used in place of the circular die, and the temperature of the die was 215° C., to produce a fiber-reinforced elastic article. The physical properties of the resultant elastic article are shown in Table 1.

Table 1

| Example No. | 100% Modulus (kg/cm²) | 300% Modulus (kg/cm²) | Tensile strength (kg/cm²) | Ultimate elongation (%) |
|---|---|---|---|---|
| Example 1 Comparison | 67 | 170 | 238 | 398 |
| Example 1 | 28 | 138 | 316 | 534 |
| Example 2 | 57 | 170 | 230 | 396 |
| Example 3 | 69 | 175 | 240 | 399 |
| Example 4 | 65 | 174 | 250 | 413 |

Table 1 clearly shows that the elastic articles of Examples 1 through 4 have a remarkably higher modulus of elasticity than that of Comparison Example 1.

EXAMPLE 5

A mixture of natural rubber having a viscosity of $2 \times 10^5$ poise with 30 parts of 1,2-polybutadiene having a reduced viscosity of 1.20 dl/g, a melting point of 196° C. and a content of 1,2-structure of 99% per 100 parts of the natural rubber, was kneaded by means of a screw type extruder having a kneading cylinder. The kneading cylinder had an inner diameter of 20 mm and was heated to temperatures of 70° C. at an inlet part of the cylinder below a hopper for feeding the mixture into the cylinder, of 70° C. at a middle part of the cylinder and of 230° C. at an outlet part of the extruder. The kneaded dispersion was extruded at a temperature of 230° C. through a circular die, which was connected to the outlet end of the kneading cylinder, and had an inner diameter of 2 mm and a ratio of length to inner diameter thereof 2/1, to prepare strand of the dispersion having a diameter of 3 mm. In order to determine the viscosity of the kneaded dispersion, the same kneading operation as that mentioned above was repeated, except that the outlet part of the kneading cylinder of the extruder was heated to a temperature of 70° C. instead of 230° C. The resultant kneaded dispersion had a viscosity of $3.5 \times 10^4$ poises.

The strand of the extruded dispersion was rolled at a temperature of 80° C. by means of a pair of rollers having a clearance of 0.2 mm therebetween. The resultant tape of the rolled dispersion had a thickness of 0.5 mm.

A mixture of 28 parts of the above-prepared tape of the rolled dispersion with 74 parts of additional natural rubber of International Standard RSS3, 50 parts of the same carbon black as that mentioned in Example 1, 5 parts of same process oil as that mentioned in Example 1, 5 parts of zinc oxide, 4 parts of stearic acid and 1 part of phenyl-β-naphthyl amine was kneaded in the same manner as mentioned in Example 1. The kneaded mixture was admixed with 1 part of 2-mercaptobenzothiazole and 3 parts of sulphur by the same method as that mentioned in Example 1, to prepare a composition.

The composition was shaped in mold and vulcanized at a temperature of 150° C. for 40 minutes. The physical properties of the resultant fiber-reinforced elastic article are shown in Table 2.

EXAMPLE 6

Procedures identical to those described in Example 5 were carried out, except that the composition contained 43 parts of the tape of the rolled dispersion and 67 parts of the additional natural rubber, to prepare a fiber-reinforced elastic article. The physical properties of the resultant elastic article are shown in Table 2.

EXAMPLE 7

The same procedures as those mentioned in Example 5 were carried out, except that in order to prepare a composition to be shaped and vulcanized, 87 parts of the tape of the rolled dispersion and 33 parts of the additional natural rubber were used. The physical properties of the resultant fiber-reinforced elastic article are shown in Table 2.

Table 2

| Example No. | 100% Modulus (kg/cm²) | 300% Modulus (kg/cm²) | Tensile strength (kg/cm²) | Ultimate elongation (%) |
|---|---|---|---|---|
| 5 | 59 | 179 | 244 | 398 |
| 6 | 70 | 181 | 214 | 347 |
| 7 | 94 | — | 178 | 256 |

EXAMPLE 8

A mixture of 26 parts of natural rubber having a viscosity of $2 \times 10^5$ poises with 6.4 parts of 1,2-polybutadiene having a reduced viscosity of 1.20 dl/g, a melting point of 196° C. and a content of 1,2-structure of 99% was kneaded at a temperature of 50° C. for 10 minutes by using kneading rollers. The kneaded dispersion had a viscosity of $1.0 \times 10^4$ poises.

The kneaded dispersion was fed into a screw type extruder provided with a kneading cylinder having an inner diameter of 20 mm, and with a T-shaped die located at an outlet end of the cylinder, the die having a slit width of 0.5 mm, a slit length of 0.5 mm and a dieland length of 10 mm. The dispersion was extruded at a temperature of the die of 220° C. to provide a tape of the extruded dispersion having a thickness of 1.0 mm. The tape of the extruded dispersion was rolled at a temperature of 50° C. by using a pair of rollers having a clearance of 0.05 mm therebetween. A sheet of the rolled dispersion having a thickness of 0.3 mm was obtained.

A mixture of 32.4 parts of the rolled dispersion with 74 parts of additional natural rubber of International Standard RSS3, 50 parts of the same carbon black as that mentioned in Example 1, 5 parts of the same process oil as that mentioned in Example 1, 5 parts of zinc oxide, 4 parts of stearic acid and 1 part of phenyl-β-naphthylamine was placed in a Brabender type kneader and kneaded at a temperature of 80° C. for 5 minutes. The kneaded mixture was admixed with 1 part of 2-mercaptobenzothiazole and 3 parts of sulphur, and the admixture was kneaded by using kneading rollers, at a temperature of 83° C. for 5 minutes, to provide a uniform composition. The composition was shaped in a mold and vulcanized at a temperature of 150° C. for 40 minutes. The resultant fiber-reinforced elastic article had a 100% modulus of 68 kg/cm$^2$, a 300% modulus of 178 kg/cm$^2$, a tensile strength of 244 kg/cm$^2$ and an ultimate elongation of 397%.

EXAMPLE 9

A mixture of 100 parts of natural rubber having a viscosity of $2 \times 10^5$ poises with 30 parts of powdered 1,2-polybutadiene capable of completely passing through a Tyler Standard screen of 10 mesh, and having a reduced viscosity of 1.20 dl/g, a melting point at 198° C. and a content of 1,2-structure of 99%, was fed into a Brabender type Kneader. The mixture was kneaded in the kneader at a temperature of 80° C. for 5 minutes, and then, passed at a temperature of 80° C. through a pair of rollers to provide a sheet of the kneaded dispersion.

The kneaded dispersion was fed into a screw type extruder provided with a kenading cylinder having an inner diameter of 20 mm and with a torpedo located in a circular die connected to the outlet end of the cylinder. The torpedo was provided with two spherical cone-shaped end parts and had a maximum diameter of 16 mm and a length of 154 mm. The circular die had an extruding nozzle having an inner diameter of 2 mm and a length of 2 mm.

The end portion of the cylinder, the torpedo and the extruding nozzle were respectively heated to temperatures of 170° C., 210° C. and 230° C. The above-provided kneaded dispersion was extruded through the extruder to provide a strand of the extruded dispersion having a diameter of 3 mm. The dispersion in the outlet part of the cylinder had a viscosity of $1 \times 10^5$ poises. The extruded strand of the dispersion was rolled by means of a pair of rollers having a clearance of 0.02 mm therebetween at a temperature of 50° C., to provide a rolled tape of the dispersion having a thickness of 0.5 mm.

A mixture of 28 parts of the above described rolled tape of the dispersion with 74 parts of additional natural rubber of International Standard RSS3, 50 parts of the same carbon black as that mentioned in Example 1, 5 parts of the same process oil as that mentioned in Example 1, 5 parts of zinc oxide, 4 parts of stearic acid and 1 part of phenyl-$\beta$-naphthylamine was charged into a Brabender type kneader, and kneaded therein at a temperature of 115° C. for 5 minutes. The kneaded mixture was admixed with 1 part of 2-mercaptobenzothiazole and 3 parts of sulphur, and the admixture was kneaded with kneading rollers at a temperature of 83° C. for 5 minutes to prepare a composition. The composition was shaped in a mold and vulcanized at a temperature of 150° C. for 40 minutes. The resultant fiber-reinforced elastic article had a 100% modulus of 63 kg/cm$^2$, a 300% modulus of 219 kg/cm$^2$, a tensile strength of 297 kg/cm$^2$ and an ultimate elongation of 390%.

EXAMPLE 10

100 parts of a natural rubber of International Standard RSS3 having a viscosity of $2 \times 10^5$ poises were kneaded in a Brabender type kneader at a temperature of 80° C. for 1 minute. 39 parts of a powdered 1,2-polybutadiene having a reduced viscosity of 1.40 dl/g, a melting point of 198° C. and a content of 1,2-structure of 99% were added to the natural rubber and the mixture thus obtained was kneaded in the kneader at a temperature of 80° C. for 1 minute. 30 parts of the same process oil as that mentioned in Example 1 was added to the mixture, and the obtained mixture was kneaded in the kneader at a temperature of 80° C. for 3 minutes. The resultant kneaded dispersion was shaped into a sheet by being passed through a pair of rollers at a temperature of 83° C.

The sheet of the dispersion was fed into a screw type extruder provided with a kneading cylinder having an inner diameter of 20 mm and with a T-shaped die located at the outlet end of the cylinder, the die having a slit width of 0.5 mm, a slit length of 100 mm and a dieland length of 20 mm. The dispersion was kneaded in the cylinder without heating it and, then, extruded through the T-shaped die at a temperature 230° C., to provide a tape of the dispersion having a thickness of 1.0 mm. The dispersion located in the outlet part of the cylinder had a viscosity of $4.5 \times 10^4$ poises. The tape of the dispersion was shaped into a sheet having a thickness of 0.2 mm by using a pair of rollers having a clearance of 0.02 mm therebetween at a temperature of 50° C.

A mixture of 28 parts of the rolled dispersion with 84 parts of an additional natural rubber of International Standard RSS3, 50 parts of the same carbon black as that mentioned in Example 1, 5 parts of zinc oxide, 4 parts of stearic acid and 1 part of phenyl-$\beta$-naphthylamine, was charged into a Brabender type kneader, and kneaded at a temperature of 115° C. for 5 minutes. Then, 1 part of 2-mercaptobenzothiazole and 3 parts of sulphur were added to the mixture, and the resultant mixture was kneaded in kneading rollers at a temperature of 83° C. for 5 minutes. A sheet of composition to be shaped and vulcanized was obtained.

The composition was shaped in a mold and vulcanized at a temperature of 150° C. for 40 minutes. The physical properties of the resultant fiber-reinforced elastic article are shown in Table 3.

EXAMPLE 11

The same procedures as those mentioned in Example 10 were carried out, except that no process oil was used, to produce an elastic article. The physical properties of the resultant fiber-reinforced elastic article are shown in Table 3.

EXAMPLE 12

The same procedures as those mentioned in Example 10 were carried out with the following exception. In the preparation of the kneaded dispersion, the 1,2-polybutadiene and the process oil were used in amounts of 42 parts and 40 parts, respectively. The viscosity of the kneaded dispersion located in the outlet end of the cylinder of the extruder was $4.0 \times 10^4$ poises. Also, in the preparation of the composition to be shaped and vulcanized, the additional natural rubber was used in an amount of 85 parts. The physical properties of the resulting fiber-reinforced elastic article are shown in Table 3.

EXAMPLE 13

The same procedures as those described in Example 10 were carried out with the following exception. In the preparation of the kneaded dispersion, the 1,2-polybutadiene was used in an amount of 65 parts. The viscosity of the kneaded dispersion located in the outlet end of the cylinder of the extruder was $4.5 \times 10^4$ poises. Also, the preparation of the composition, the extruded dispersion and the additional natural rubber were used in amounts of 19 parts and 90 parts, respectively. The physical properties of the obtained fiber-reinforced elastic article are shown in Table 3.

Table 3

| Example No. | 100% Modulus (kg/cm$^2$) | 200% Modulus (kg/cm$^2$) | 300% Modulus (kg/cm$^2$) | Ultimate elongation (%) | Tensile strength (kg/cm$^2$) |
|---|---|---|---|---|---|
| 10 | 70 | 142 | 224 | 349 | 257 |
| 11 | 65 | 123 | 181 | 460 | 260 |
| 12 | 68 | 131 | 208 | 374 | 254 |
| 13 | 71 | 132 | 207 | 387 | 266 |

EXAMPLE 14

Procedures identical to those mentioned in Example 10 were carried out, except that the 1,2-polybutadiene had a reduced viscosity of 1.07 dl/g, a melting point of 194° C. and a content of 1,2-structure of 99%, and the viscosity of the kneaded dispersion located in the outlet end of the cylinder of the extruder was $3.9 \times 10^4$ poises. The physical properties of the resulting fiber-reinforced elastic article are shown in Table 4.

EXAMPLE 15

Procedures identical to those mentioned in Example 10 were carried out, except that a circular die provided with an extruding nozzle having an inner diameter of 2 mm and a length of 4 mm was used in place of the T-shaped die, the die was heated at a temperature of 230° C., the extruded dispersion was in the form of a strand having a diameter of 4 mm and the tape of the rolled dispersion had a thickness of 0.2 mm. The physical properties of the resulting fiber-reinforced elastic article are shown in Table 4.

EXAMPLE 16

The same procedures as those described in Example 10 were carried out, except that a rectangular die having a slit width of 0.5 mm, a slit length of 10 mm and a dieland length of 20 mm were used in place of the T-shaped die, the die was heated at a temperature of 230° C. and the resultant tape of the extruded dispersion was in the form of a tape having a thickness of 2 mm. The physical properties of the fiber-reinforced elastic article are shown in Table 4.

Table 4

| Example No. | 100% Modulus (kg/cm$^2$) | 200% Modulus (kg/cm$^2$) | 300% Modulus (kg/cm$^2$) | Ultimate elongation (%) | Tensile strength (kg/cm$^2$) |
|---|---|---|---|---|---|
| 14 | 60 | 126 | 207 | 361 | 249 |
| 15 | 71 | 143 | 213 | 374 | 264 |
| 16 | 67 | 134 | 211 | 367 | 258 |

EXAMPLE 17

The same procedures as those mentioned in Example 10 were carried out, except that the aromatic type process oil was replaced with a paraffin type process oil of the trademark 60-SPIN-paraffin type, made by Idemitsu Kosan K.K., Japan, and the viscosity of the kneaded dispersion located in the outlet part of the cylinder of the extruder was $4.8 \times 10^4$ poises. The physical properties of the resulting fiber-reinforced elastic article are shown in Table 5.

EXAMPLE 18

The same procedures as those mentioned in Example 10 were carried out, except that a naphthene type process oil of the Trademark 60-SPIN-naphthene type, made by Idemitsu Kosan K.K., Japan was used in place of the aromatic type process oil, and the viscosity of the kneaded dispersion located in the outlet part of the cylinder of the extruder was $5.1 \times 10^4$ poises. The physical properties of the resulting fiber-reinforced elastic article are shown in Table 5.

Table 5

| Example No. | 100% Modulus (kg/cm$^2$) | 200% Modulus (kg/cm$^2$) | 300% Modulus (kg/cm$^2$) | Ultimate elongation (%) | Tensile strength (kg/cm$^2$) |
|---|---|---|---|---|---|
| 17 | 67 | 136 | 212 | 345 | 246 |
| 18 | 68 | 135 | 211 | 348 | 248 |

EXAMPLE 19

The same procedures as those mentioned in Example 9 were repeated with the following exceptions. In the preparation of the kneaded dispersion, the 1,2-polybutadiene was used in an amount of 39 parts and 30 parts of the same process oil as that mentioned in Example 1 were added to the mixture of the natural rubber and the 1,2-polybutadiene. In the extruding operation, the viscosity of the kneaded dispersion located in the outlet part of the cylinder of the extruder was $5.0 \times 10^4$ poises. In the preparation of the composition, the additional natural rubber was used in an amount of 84 parts and no process oil was used. The physical properties of the resulting fiber-reinforced elastic article are shown in Table 6.

EXAMPLES 20 through 24

In each of Examples 20 through 24, the same procedures as those mentioned in Example 19 were carried out, except that the outlet part of the cylinder of the extruder was heated at a temperature shown in Table 6. The physical properties of the resulting fiber-reinforced elastic articles are shown in Table 6.

Table 6

| Example No. | Temperature of outlet of extruder cylinder (%) | 100% Modulus (kg/cm$^2$) | 200% Modulus (kg/cm$^2$) | 300% Modulus (kg/cm$^2$) | Ultimate elongation (%) | Tensile strength (kg/cm$^2$) |
|---|---|---|---|---|---|---|
| 19 | 170 | 63 | 128 | 208 | 422 | 298 |
| 20 | 180 | 63 | 133 | 212 | 416 | 304 |
| 21 | 200 | 61 | 132 | 213 | 415 | 298 |
| 22 | 80 | 63 | 123 | 193 | 400 | 264 |
| 23 | 150 | 64 | 128 | 204 | 401 | 277 |
| 24 | 160 | 63 | 125 | 200 | 391 | 259 |

COMPARISON EXAMPLE 2

A mixture of 100 parts of a natural rubber of International Standard RSS3 with 6.5 parts of nylon 6 staple fibers, each having a length of 2 mm, a diameter of 32 microns, an initial modulus of elasticity of $4.0 \times 10^4$ kg/cm$^2$ and a tensile strength of $9.2 \times 10^3$ kg/cm$^2$, 50 parts of the same carbon black as that mentioned in Example 1, 5 parts of zinc oxide, 5 parts of the same process oil as that mentioned in Example 1, 4 parts of stearic acid and 1 part of phenyl-β-naphthylamine, was charged into a Brabender type kneader and kneaded therein at a temperature of 80° C. for 5 minutes. The kneaded mixture was admixed with 3 parts of sulphur and 1 part of 2-mercaptobenzothiazole, and the resultant admixture was kneaded by means of kneading rollers at a temperature of 83° C. for 5 minutes, to provide a composition to be converted into a shaped elastic article.

The composition was shaped in a mold and vulcanized at a temperature of 150° C. for 40 minutes. The physical properties of the resulting comparative fiber-reinforced elastic article are shown in Table 7.

COMPARISON EXAMPLE 3

The same procedures as those mentioned in Comparison Example 2 were carried out, except that 6.5 parts of poly-p-phenylene terephthalamide staple fibers, each having a length of 1.5 mm, a diameter of 10.8 microns, an initial modulus of elasticity of $7.4 \times 10^5$ kg/cm$^2$ and a tensile strength of $3.4 \times 10^4$ kg/cm$^2$, were used in place of the nylon 6 fibers. The physical properties of this comparative fiber-reinforced elastic article are shown in Table 7.

Table 7

| Comparative Example No. | 100% Modulus (kg/cm$^2$) | 200% Modulus (kg/cm$^2$) | 300% Modulus (kg/cm$^2$) | Ultimate elongation (%) | Tensile strength (kg/cm$^2$) |
|---|---|---|---|---|---|
| 2 | 38 | 83 | 140 | 430 | 229 |
| 3 | 61 | 101 | 163 | 400 | 216 |

EXAMPLE 25

The same procedures as those mentioned in Example 20 were carried out, except that the 1,2-polybutadiene had a reduced viscosity of 2.06 dl/g, a melting point of 206° C. and a content of 1,2-structure of 99%, and was capable of completely passing through a Tyler Standard screen of 10 mesh. Furthermore, the viscosity of the kneaded dispersion located in the outlet part of the cylinder of the extruder was $5.5 \times 10^4$ poises. The physical properties of the resulting fiber-reinforced elastic article are shown in Table 8.

EXAMPLE 26

The same procedures as those mentioned in Example 20 were carried out, except that the 1,2-polybutadiene had a reduced viscosity of 0.99 dl/g, a melting point of 196° C. and a content of 1,2-structure of 99%, and was capable of completely passing through a Tyler Standard screen of 10 mesh. Furthermore, the viscosity of the kneaded dispersion located in the outlet part of the cylinder of the extruder was $4.0 \times 10^4$ poises. The physical properties of the resulting fiber-reinforced elastic article are shown in Table 8.

Table 8

| Example No. | 100% Modulus (kg/cm$^2$) | 200% Modulus (kg/cm$^2$) | 300% Modulus (kg/cm$^2$) | Ultimate elongation (%) | Tensile strength (kg/cm$^2$) |
|---|---|---|---|---|---|
| 25 | 64 | 125 | 215 | 411 | 302 |
| 26 | 63 | 136 | 218 | 422 | 313 |

EXAMPLE 27

A sheet of extruded dispersion was prepared by the same method as that described in Example 10.

A mixture of 28 parts of the above-prepared extruded dispersion with 34 parts of an additional natural rubber of International Standard RSS1, 50 parts of polybutadiene (Trademark: UBEPOL 150 made by Ube Industries Limited, Japan), 50 parts of the same carbon black as that mentioned in Example 1, 5 parts of zinc oxide, 4 parts of stearic acid and 1 part of phenyl-β-naththylamine, was charged into a Brabender type kneader, and kneaded therein at a temperature of 115° C. for 5 minutes. The kneaded mixture was admixed with 1 part of N-cyclohexyl-2-benzothiazole sulfenamide, 0.1 parts of tetramethylthiuram disulfide and 2 parts of sulphur, and the obtained admixture was kneaded by means of kneading rollers at a temperature of 83° C. for 5 minutes.

The resulting composition was shaped in a mold and vulcanized at a temperature of 150° C. for 40 minutes. The physical properties of the resulting fiber-reinforced elastic article are shown in Table 9.

EXAMPLE 28

The same procedures as those mentioned in Example 27 were carried out, except that 50 parts of a styrene-butadiene copolymer (Trademark: JSR SBR 1500, made by Nippon Synthetic Rubber Co., Ltd). were used in place of the polybutadiene. The physical properties of the resulting fiber-reinforced elastic article are shown in Table 9.

Table 9

| Example No. | 100% Modulus (kg/cm$^2$) | 200% Modulus (kg/cm$^2$) | 300% Modulus (kg/cm$^2$) | Ultimate elongation (%) | Tensile strength (kg/cm$^2$) |
|---|---|---|---|---|---|
| 27 | 60 | 126 | 200 | 383 | 261 |
| 28 | 65 | 138 | 223 | 398 | 303 |

What we claim is:

1. A process for producing a fiber-reinforced elastic article, which comprises the steps of:
   kneading a mixture of a rubber material capable of being vulcanized and powdered 1,2-polybutadiene in an amount of 1 to 200 parts by weight per 100 parts by weight of said rubber material, at a temperature lower than the melting point of said 1,2-polybutadiene, to disperse the particles of said 1,2-polybutadiene in the matrix of said rubber material, said 1,2-polybutadiene containing 80% or more of 1,2-structure;
   extruding said dispersion through a die at a temperature of at least 5° C. above the melting point of said 1,2-polybutadiene but not higher than 240° C. to provide a strand or tape of said dispersion in which said dispersed 1,2-polybutadiene is in the form of fibrils;
   rolling said extruded dispersion by means of a pair of rollers to provide a tape or sheet of said dispersion and to cause the 1,2-polybutadiene fibrils to have an increased degree of molecular orientation, said resultant rolled dispersion tape or sheet having a thickness of 0.02 mm or more and not exceeding one-half of the thickness of said extruded dispersion strand or tape;
   providing a composition, (A) when the content of said 1,2-polybutadiene in said rolled dispersion is 1 to 20 parts by weight per 100 parts by weight of said rubber material, by admixing said rolled dispersion with a vulcanizing agent or (B) when the content of said 1,2-polybutadiene in said rolled dispersion is more than 1 part by weight but not more than 200 parts by weight per 100 parts by weight of said rubber material, by admixing said rolled dispersion with a vulcanizing agent and an additional rubber material capable of being vulcanized, said additional rubber material being in an amount enough for adjusting the content of said 1,2-polybutadiene in the resultant composition to a level of from 1 to 20 parts by weight per 100 parts by weight of the sum of said rubber material and said additional rubber material, and;

shaping and vulcanizing said composition to provide a shaped, vulcanized elastic article.

2. A process as claimed in claim 1, wherein said mixture contains a process oil in an amount of 100 parts by weight or less per 100 parts by weight of said rubber material, together with said rubber material and 1,2-polybutadiene.

3. A process as claimed in claim 1, wherein said rubber material is selected from natural rubber, polyisoprene, and mixtures of the above-mentioned materials.

4. A process as claimed in claim 1, wherein said 1,2-polybutadiene has a reduced viscosity of from 0.8 to 2.5 dl/g determined by using a solution of 0.2 g of said 1,2-polybutadiene in 100 ml of tetrahydronaphthalene at a temperature of 135° C.

5. A process as claimed in claim 1, wherein said 1,2-polybutadiene contains 80% by weight or more of 1,2-structure.

6. A process as claimed in claim 1, wherein the amount of said 1,2-polybutadiene in said mixture to be kneaded is in a range of from 1 to 100 parts by weight per 100 parts by weight of said rubber material.

7. A process as claimed in claim 1, wherein said kneading operation is applied to a mixture of natural rubber and 1,2-polybutadiene and continued until the resultant dispersion attains a viscosity within a range of from $1 \times 10^3$ to $1 \times 10^6$ poise.

8. A process as claimed in claim 1, wherein said extruding operation is carried out by using a circular die having an inner diameter of from 0.1 to 5 mm and a ratio of length to inner diameter of from 1 to 20.

9. A process as claimed in claim 1, wherein said rolling operation is carried out at a temperature of from 20° to 80° C.

10. A process as claimed in claim 1, wherein said fibrils of 1,2-polybutadiene in said rolled dispersion each has a thickness of from 0.05 to 20 microns.

11. A process as claimed in claim 1, wherein said rolled dispersion is in the form of a tape having a thickness of 0.02 mm or more and not exceeding one-half the thickness of said extruded dispersion in the form of a tape.

12. A process as claimed in claim 1, wherein said additional rubber material is selected from natural rubber, cis-1,4-polybutadiene, polyisoprene, polychloroprene, styrene-butadiene copolymers, isoprene-isobutylene copolymers, ethylene-propylene-diene terpolymers, and mixtures of two or more of the above-mentioned materials.

13. A process as claimed in claim 1, wherein said vulcanizing operation is carried out at a temperature of 10° C. or more below the melting point of said 1,2-polybutadiene.

14. A process as claimed in claim 1, wherein said vulcanizing operation is carried out at a temperature of from 120° to 180° C.

* * * * *